(12) United States Patent
Balasubramanian et al.

(10) Patent No.: US 11,870,877 B2
(45) Date of Patent: *Jan. 9, 2024

(54) SCALABLE SOCKETS FOR QUIC

(71) Applicant: Microsoft Technology Licensing, LLC, Redmond, WA (US)

(72) Inventors: Praveen Balasubramanian, Redmond, WA (US); Matthew A. Olson, Redmond, WA (US); Nicholas A. Banks, Duvall, WA (US); Sourav Das, Bellevue, WA (US); Nicholas J. Grifka, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,821

(22) Filed: Jan. 3, 2022

(65) Prior Publication Data

US 2022/0124180 A1 Apr. 21, 2022

Related U.S. Application Data

(63) Continuation of application No. 16/217,007, filed on Dec. 11, 2018, now Pat. No. 11,223,708.

(Continued)

(51) Int. Cl.
*H04L 69/164* (2022.01)
*H04L 69/16* (2022.01)
(Continued)

(52) U.S. Cl.
CPC .......... *H04L 69/164* (2013.01); *H04L 69/161* (2013.01); *H04L 69/162* (2013.01);
(Continued)

(58) Field of Classification Search
CPC ... H04L 69/161; H04L 69/162; H04L 69/164; H04L 69/165; H04L 69/168; H04L 69/169

See application file for complete search history.

(56) References Cited

U.S. PATENT DOCUMENTS

10,567,284 B1 * 2/2020 Piriyath .............. H04L 63/1408
2006/0209796 A1 * 9/2006 Scott ....................... H04L 65/80
370/352

(Continued)

OTHER PUBLICATIONS

"Notice of Allowance Issued in European Patent Application No. 19735458.2", dated Aug. 25, 2022, 2 Pages.

(Continued)

*Primary Examiner* — Thomas J Dailey

(57) ABSTRACT

A system having scalable sockets to support User Datagram Protocol (UDP) connections identifies a plurality of UDP connections, wherein a plurality of remote clients connect to corresponding ones of the plurality of UDP connections. Each one of a plurality of UDP sockets is associated with a corresponding one of the plurality of UDP connections. A network stack lookup for UDP packets in network traffic is performed using a network stack to identify the UDP socket corresponding to the remote client associated with each of the UDP packet. The UDP packets are buffered with a send buffer and a receive buffer for the UDP socket corresponding to the remote client associated with the UDP packets as determined by the network stack lookup to support communication over the plurality of UDP connections using the plurality of UDP sockets. The system thereby operates more efficiently and/or is more scalable.

20 Claims, 8 Drawing Sheets

Related U.S. Application Data

(60) Provisional application No. 62/690,275, filed on Jun. 26, 2018.

(51) Int. Cl.
*H04L 69/165* (2022.01)
*H04L 69/168* (2022.01)

(52) U.S. Cl.
CPC .......... *H04L 69/165* (2013.01); *H04L 69/168* (2013.01); *H04L 69/169* (2013.01)

(56) References Cited

U.S. PATENT DOCUMENTS

| | | | | |
|---|---|---|---|---|
| 2014/0237097 A1* | 8/2014 | Riikonen | ................ | H04L 69/22 |
| | | | | 709/223 |
| 2014/0301389 A1* | 10/2014 | Bajpai | .................... | H04L 69/16 |
| | | | | 370/389 |
| 2016/0173238 A1* | 6/2016 | Naaman | ................ | H04L 1/1621 |
| | | | | 714/749 |
| 2016/0191554 A1* | 6/2016 | Kaminsky | .......... | H04L 63/1425 |
| | | | | 726/23 |

OTHER PUBLICATIONS

"Notice of Allowance Issued in European Patent Application No. 19739460.4", dated Mar. 4, 2022, 7 Pages.

"Notice of Allowance Issued in European Patent Application No. 19735458.2", dated May 13, 2022, 7 Pages.

"Notice of Allowance Issued in European Patent Application No. 19739460.4", dated Jun. 17, 2022, 2 Pages.

"Extended European Search Report Issued in European Patent Application No. 22195015.7", dated Nov. 24, 2022, 7 Pages.

* cited by examiner

SCALABLE SOCKETS FOR QUIC

CROSS-REFERENCE TO RELATED APPLICATION

This application is a continuation of and claims the benefit of and priority to U.S. Non Provisional application Ser. No. 16/217,007, entitled "Scalable Sockets for QUIC", filed Dec. 11, 2018, which claims the benefit of and priority to U.S. Provisional Application No. 62/690,275, entitled "Batch Processing and Scalable Sockets For QUIC", filed Jun. 26, 2018, which are incorporated by reference herein in their entireties.

BACKGROUND

Communication protocols define the end-to-end connection requirements across a network. QUIC is a recently developed networking protocol that defines a transport layer network protocol that is an alternative to the Transmission Control Protocol (TCP). QUIC supports a set of multiplexed connections over the User Datagram Protocol (UDP) and attempts to improve perceived performance of connection-oriented web applications that currently use TCP. For example, QUIC connections seek to reduce the number of round trips required when establishing a new connection, including the handshake step, encryption setup, and initial data requests, thereby attempting to reduce latency. QUIC also seeks to improve support for stream-multiplexing.

Traditionally, all UDP applications are message oriented. As a result, the message boundary needs to be preserved across packetization on send and reconstructed on receive. Also, Internet Protocol (IP) fragmentation has large performance overhead on both the host and the network, so to avoid IP fragmentation, applications typically post sends that are smaller than a maximum transmission unit (MTU), such as one packet at a time, which results in very poor performance. The poor performance results because the entire data path from the application to the network interface card (NIC) is executed for each small packet (or send down call). Similarly on the receiver side, although the NIC can indicate multiple packets, each packet is indicated one at a time from the network stack to the application (in a receive up call).

Thus, UDP performance problems due to applications posting one small send at a time to avoid fragmentation. Similarly, receive packets are indicated one at a time. In comparison, TCP performance allows batched operations as the data stream is configured as a byte stream. However, current UDP application programming interfaces (APIs) do not allow an application to take advantage of batch processing of packets.

Additionally, UDP is a message oriented transport protocol and the socket APIs on various operating systems (including the Windows® operating system) expose use of UDP as datagram sockets. Use of TCP is exposed as stream sockets. One of the main differences between the APIs is that in the TCP stream socket on the server (listening) socket, there is a notion of the accept API for an incoming connection that results in a new socket object for the child connection. In comparison, for a UDP datagram socket, there is no notion of a listen or accept API. Hence, all incoming connection requests use the same socket object. This can cause problems including that the receive packet processing does not scale well and there is fate sharing among all child connections because of the shared receive buffers and locks. Thus, implementing any UDP server hits scale bottlenecks because all incoming connection requests share the same socket. This configuration can cause performance issues due to locking or other synchronization. The configuration can also cause performance issues due to fate sharing where one connection processing can stall others, or one connection uses up all the receive buffers causing packet drops for other connections.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method to support User Datagram Protocol (UDP) connections with scalable sockets comprises identifying a plurality of UDP connections, wherein a plurality of remote clients connect to corresponding ones of the plurality of UDP connections, and each one of a plurality of UDP sockets is associated with a corresponding one of the plurality of UDP connections. The computerized method further comprises performing a network stack lookup for UDP packets in network traffic using a network stack to identify the UDP socket corresponding to the remote client associated with each of the UDP packets. The computerized method also includes synchronizing a plurality of UDP flows of the network traffic using a send buffer and a receive buffer corresponding to each UDP socket of the plurality of UDP sockets. The synchronizing includes buffering UDP packets with the send buffer and the receive buffer for the UDP socket corresponding to the remote client associated with the UDP packets as determined by the network stack lookup to support communication over the plurality of UDP connections using the plurality of UDP sockets.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

DETAILED DESCRIPTION

One or more computing devices and methods described herein are configured to perform batching and allow for scalable sockets using QUIC. Using batched UDP packets, various examples make a single call to an API per batched UDP packet, allowing the network stack to perform operations per UDP packet batch instead of per UDP packet when sending the UDP packets (and when processing received UDP packets). Per batch sockets are also used in various examples to allow network stack processing per UDP flow (e.g., allows multiple UDP packets to be batched and indicated on the same socket). In some examples, coalesce batching combines UDP packets from the same UDP flow to allow similar processing per UDP packet batch when receiving UDP packets.

One or more computing devices and methods described herein have multiple UDP sockets, each of which has corresponding send and receive buffers. Each of the UDP sockets corresponds to a client connection to which a remote client application has connected. Thus, different sockets are provided to support different connections.

Faster UDP processing results from using batch APIs according to one or more examples and improved operation results from using scalable UDP connected sockets according to one or more examples. In this manner, when a processor is programmed to perform the operations described herein, the processor is used in an unconventional way, and allows for more efficient and/or scalable system operation, such as UDP server operation.

Figure 1:
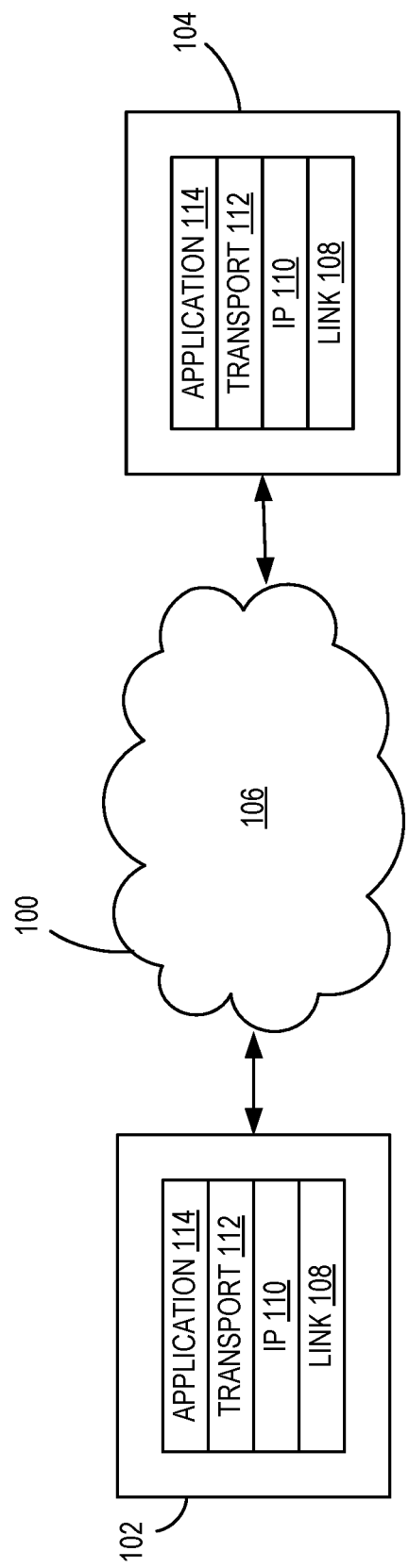
FIG. 1 is an exemplary block diagram illustrating network layers according to an embodiment.

FIG. 1 illustrates a channel 100 established between user devices 102 and 104 via a network 106. The network 106 has a plurality of network layers, illustrated as a link layer 108 (lowest layer), a network layer 110 (illustrated as an Internet Protocol (IP) layer) above the link layer 108, a transport layer 112 (which in various examples is a QUIC transport layer) above the network layer 110, and an application layer 114 above the transport layer 112. The network layers in one example are provided in accordance with a UDP/IP suite utilizing the QUIC transport layer protocol. The application layer 114 provides process-to-process communication between processes running on different hosts (e.g., general purpose computer devices) connected to the network 106, such as the user devices 102 and 104. The transport layer 112 provides end-to-end communication between different hosts, including providing end-to-end connections(s) between hosts for use by the processes. The network (internet) layer 110 provides routing (e.g., communication between different individual portions of the network 106) via routers. The link layer 108 provides communication between physical network addresses, such as Medium Access Control (MAC) addresses of adjacent nodes in the network 106, such as for the same individual network via network switches and/or hubs, which operate at the link layer 108.

In one example, the channel 100 is an application-layer channel at the application layer 114 of the network 106, established between instances of clients, running on the user devices 102 and 104. That is, the channel 100 is a process-to-process channel between the client instances on the user devices 102 and 104.

The (application-layer) channel 100 in some examples is established via one or more transport layer channels between the devices user 102 and 104, often referred to as end-to-end or host-to-host channel(s). Each transport layer channel is established via network layer channel(s) between one of user devices 102 and 104 and a router, or between pairs of routers, which are established via link layer channels within the individual networks of, for example, the Internet. It should be noted that the channel 100 can be a unidirectional channel or a bidirectional channel.

With reference to FIGS. 2-5, a computer system 200 in various examples includes one or more components configured to perform batched UDP processing and/or that have scalable sockets to support UDP connections. The computer system 200 can be any type of computing device connected to a network. One or more examples improve QUIC communications using batched data packets and/or UDP sockets configured per UDP flow. Accordingly, in some examples, the computer 200 is used in applications where the computer 200 sends or receives numerous data packets over the network. For example, the computer 200 can be a network server.

The computer system 200 in some examples is connected to other computers through a physical network link. The physical network link can be any suitable transmission medium, such as copper wire, optical fiber or, in the case of a wireless network, air.

In the illustrated example, the computer 200 includes a network adapter 202, for example a network interface card (NIC), configured to send and receive packets over a physical network link 204. The specific construction of network adapter 202 depends on the characteristics of physical network link 204. However, the network adapter 202 is implemented in one example with circuitry as is used in the data transmission technology to transmit and receive packets over a physical network link.

The network adapter 202 in one example is a modular unit implemented on a printed circuit board that is coupled to (e.g., inserted in) the computer 200. However, in some examples, the network adapter 202 is a logical device that is implemented in circuitry resident on a module that performs functions other than those of network adapter 202. Thus, the network adapter 202 can be implemented in different suitable ways.

The computer 200 includes an operating system 206 that processes packets, such as UDP packets, that are to be sent or are received by the network adapter 202. The operating system 206 in some examples is implemented in layers, with each layer containing one or more modules. In one example, the computer 200 operates according to a layered protocol and processing performed for each layer of the protocol is implemented in a separate module. However, in some examples, the operations performed by multiple modules may be performed in a single module.

Batching processes and configurations for scalable sockets using QUIC for the computer 200 will now be described, which can be implemented in connection with the channel 100 (shown in FIG. 1). It should be noted that although various examples are described as being server oriented or in a server application, the examples can be implemented in different environments, such as non-server environments (e.g., IoT to device). Additionally, it should be noted that FIGS. 2-5 illustrate various components of the computer 200, which can include additional components, and different components can be illustrated in the various examples to facilitate a description of the process being performed.

Batching

Figure 2:
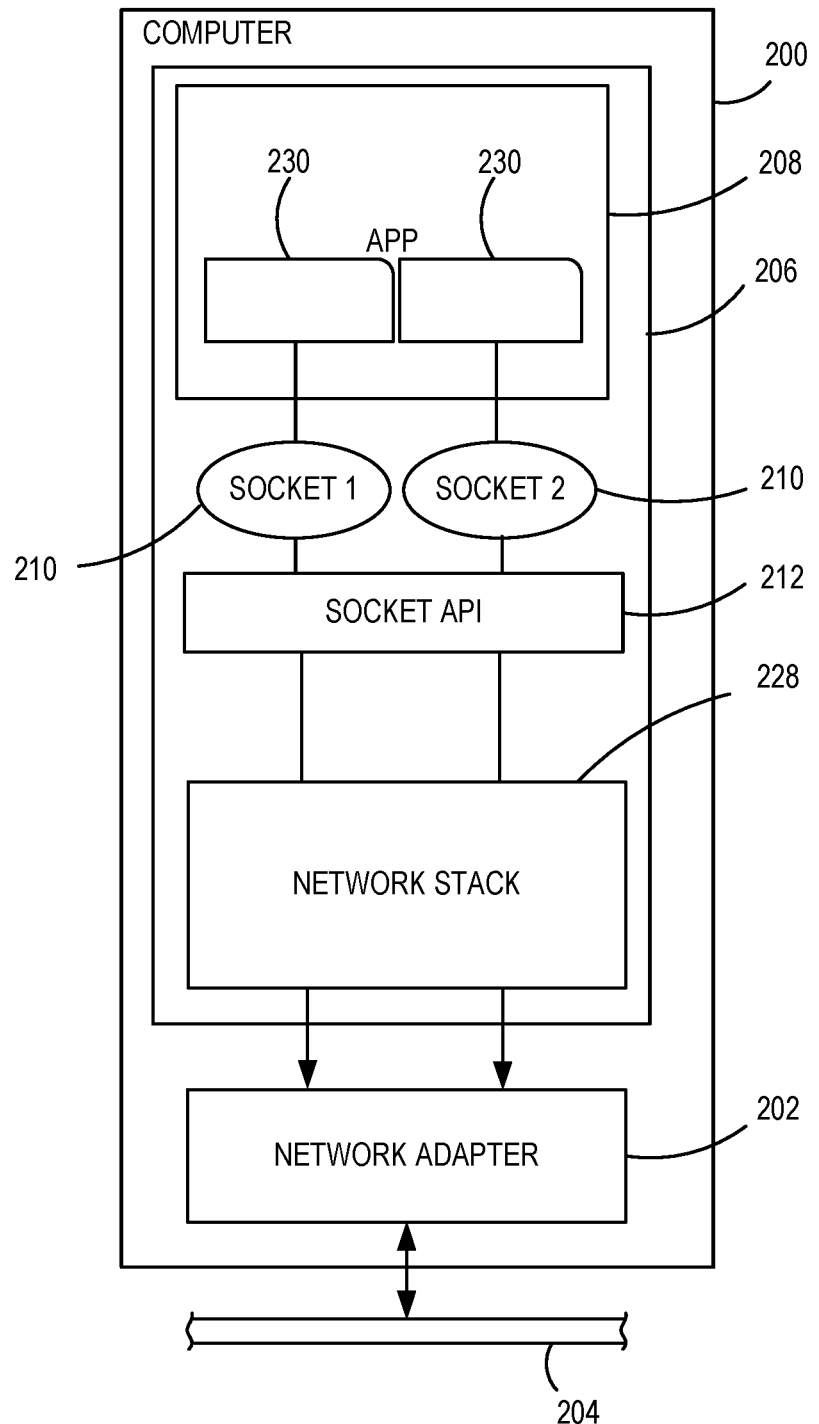
FIG. 2 illustrates send behavior with batching according to an embodiment.
Figure 3:
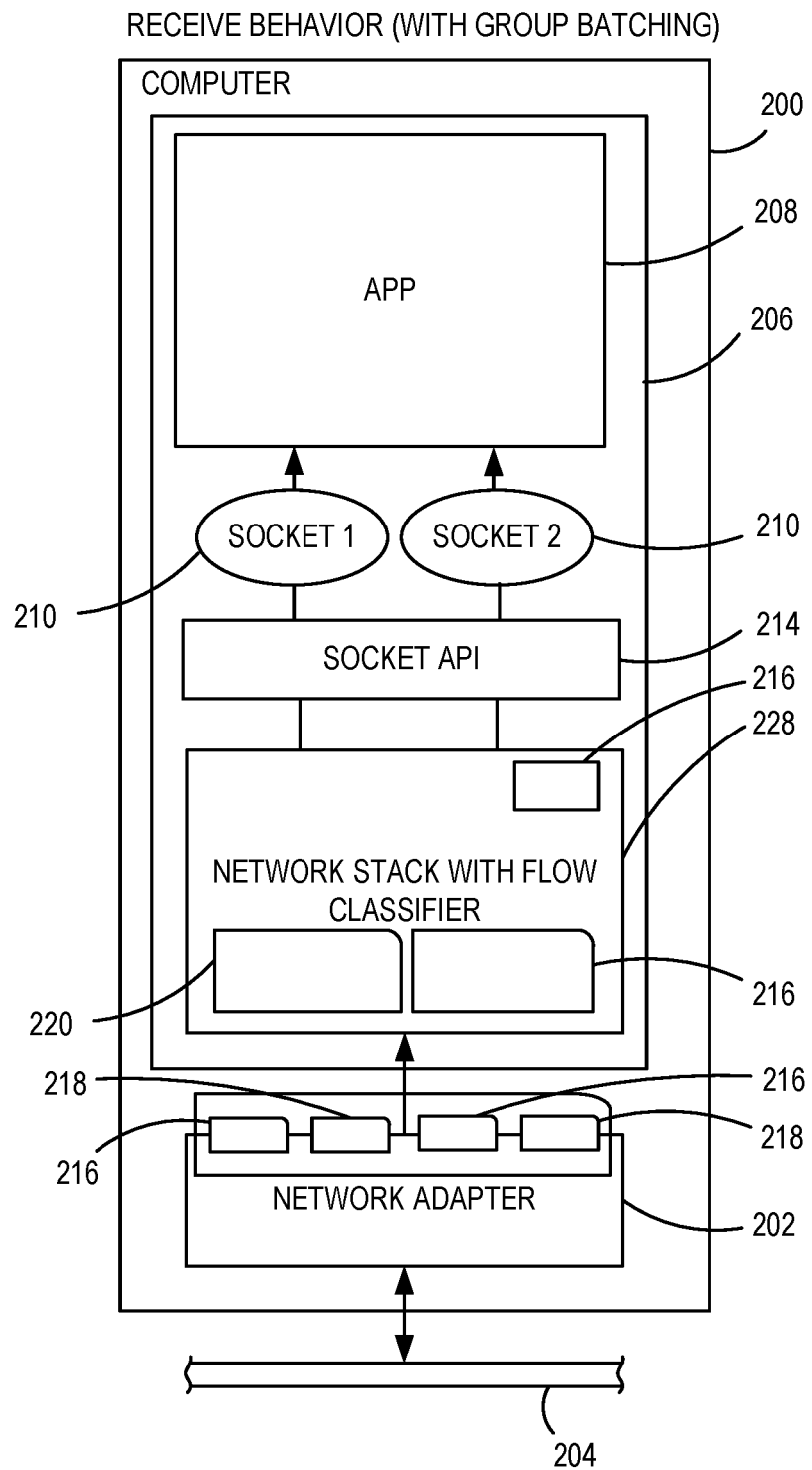
FIG. 3 illustrates receive behavior with group batching according to an embodiment.
Figure 4:
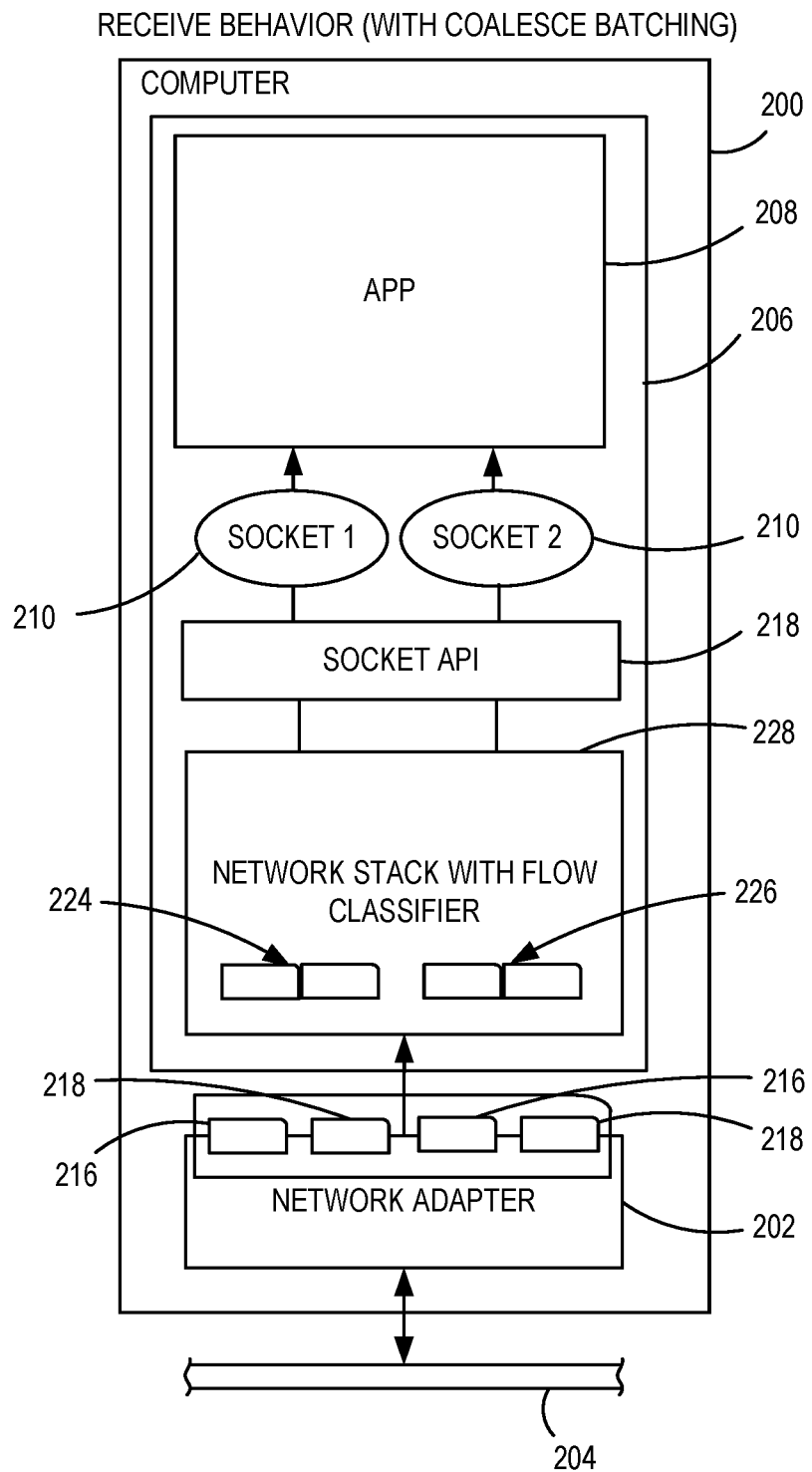
FIG. 4 illustrates receive behavior with coalesce batching according to one embodiment.

The computer 200, particularly as illustrated in FIGS. 2-4, performs UDP packet batching with one or more APIs that allow efficient processing of multiple UDP packets. For example, packet fragmentation allows a large data packet to be broken into smaller data packets and sent over UDP. The computer 200 includes a batch API that allows for batching smaller data packets into larger data packets for transmission over UDP with a single call from an application 208, instead of numerous calls. A receive-side API reassembles the data packets into the original packet. In some examples, the computer 200 forms part of a performant QUIC server that allows for the batching. It should be noted that various examples can be implemented with any datagram on top of IP.

In one example, batch APIs for UDP send and UDP receive are implemented. On send (as illustrated in FIG. 2), the API allows the application 208 to post multiple smaller-than-MTU sized messages at the same time that can be transmitted to the network adapter 202 in a single processing step of the data path. Correspondingly, the receive-side API allows for batching in two modes (as illustrated in FIGS. 3 and 4): in one mode, all data packets of a flow (UDP flow) are grouped together and indicated as a chain, and in another, multiple data packets of the same flow are indicated as a single large UDP packet along with packet boundary information.

Thus, the computer 200 in various examples is operable and/or includes the following:
1. A send batch API (illustrated as a socket API 212 in FIG. 2) for UDP sockets 210 that allows the application 208 to post multiple messages as a batch in one down call to the network adapter 202, without incurring any IP fragmentation.
2. A receive batch API (illustrated as a socket API 214 in FIG. 3) for the UDP sockets 210 that allows chaining of multiple received UDP packets 216 and 218 from the network adapter 202, to construct batches 220 and 222, respectively, to be indicated to the application 208.
3. A receive batch API (illustrated as a socket API 218 in FIG. 4) for the UDP sockets 210 that allows coalescing of multiple received UDP packets 216 and 218 from the network adapter 202, to construct single large UDP packets 224 and 226 corresponding to the UDP packets 216 and 218, respectively, to be indicated to the application 208 with message boundary information.

More particularly, for send batching, the socket API 212 is configured to allow the application 208 to post multiple buffers in the same send call. This can be implemented, for example, as a WSASendBatch API or a MSG_BATCH flag to an existing WSASend API. In one example, to fulfill this API request, a network stack 228 processes each buffer and constructs one or more groups of data packets (e.g., chain of data packets) to define packet batches 230, each corresponding to one buffer, and attaches a UDP/IP header to each packet batch 230. Thus, the chain of packets then can be processed as a batch through the entire the data flow as a single call to transmit the data packets to the network adapter 208. Any lookups that occur in the data path, such as finding the route or address resolution protocol (ARP) is performed once per packet batch 230, thereby amortizing the costs. Similarly any network security inspection can be performed as a single lookup call per packet batch 230. Additionally, the send API in some examples can take a maximum segment size (MSS) parameter and offload the generation and attaching of UDP/IP headers to each packet to the network card, thereby saving even more central processing unit (CPU) resources.

As such, in operation, the application has multiple UDP packets to send on the sockets 210. Using one or more examples of the present disclosure, the application 208 makes one down call per packet batch 230 on each socket 210. The network stack 228 performs look up and/or inspection in every down call, once per packet batch 230 as a result of the packet characteristics being the same for every packet in the packet batch 230. The network stack 228 then sends each of the packet batches 230 once to the network adapter 202. That is, all of the data packets in each packet batch 230 are sent to the network adapter 202 at the same time, which then transmits the data packets over the physical network link 204. It should be noted that in various examples, a down call refers to invoking a routine in a data transmission connection from the application 208 to the network adapter 202.

For receive batching, the socket API 214 is configured to allow the application 208 to drain multiple buffers in the same receive call. This can be implemented as a WSAReceiveBatch API or a MSG_BATCH flag to an existing WSAReceive API. If the application 208 posts the socket API 214, the network stack 228 communicates this information to a flow tracker 232 that, in various examples, runs at the bottom most entry point of the network stack 228 (e.g., immediately after packets are indicated by the network adapter 202).

In operation, the flow tracker 232 of the network stack 228 performs flow classification to group UDP packets 216 and 218 received from the physical network link 204 into one or more chains of packets belonging to the same flow to define packet groups 220 and 222, respectively. In some examples, this operation is only performed for applications using the batch APIs described herein. In one example, the classification is performed by the flow tracker 232 using, a receive side scaling (RSS) hash (e.g., performing a lookup operation to a hash table), or by performing a full lookup of the 4-tuple (e.g., source IP address, source port, destination IP, destination port).

For batching, one or both of following is performed in some examples:
1. The network stack 228 groups UDP/IP packets and indicates each of the packet groups 220 and 222 up as a single batch to the application 208. Any lookups that occur in the data path, such as finding the data route, are performed once per batch (i.e., once per packet group 220 and 222), thereby amortizing the costs. Similarly any network security inspection is performed as a single lookup call per batch.
2. The network stack 228 creates a single large UDP/IP packet comprised of data for multiple UDP/IP packets and indicates each packet (i.e., the packet groups 220 and 222) up as a single packet to the application 208. The network stack 228 also indicates the offsets of the individual packets so that the application 208 (or the UDP implementation) can then split the single UDP packet payload of each of the packet groups 220 and 222 into the individual messages as sent by the sending application.

As such, in operation when performing group batching (as illustrated in FIG. 3), the network adapter 202 receives UDP data packets from the physical network link 204 and indicates one or more batches of packets to the network stack 228. The network stack 228 groups together data packets from the same UDP flow as the packet groups 220 and 222. In some examples, inspections and lookups, as described herein, are performed once for each of the packet groups 220 and 222 by the network stack 228, which then makes an up call to the application 208 for each of the packet groups 220 and 222. It should be noted that an up call in various examples refers to invoking a routine in a data transmission connection from the network adapter 202 to the application 208.

The application 208 then receives the packet groups 220 and 222 from the network stack 228. That is, the network stack 228 sends each of the packet groups 220 and 222 once to the network adapter 202. Specifically, all of the data packets in each packet group 222 is sent to the application

208 at the same time. Thus, a single large buffer or multiple buffers are posted and completed at the same time.

As such, in operation when performing coalesce batching (as illustrated in FIG. 4), the network adapter 202 receives UDP data packets from the physical network link 204 and indicates one or more batches of packets to the network stack 228. The network stack 228 coalesces packets from the same UDP flow into a single packet. For example, the packets 216 and 218 are coalesced into the larger single UDP packets 224 and 226, respectively. In some examples, inspections and lookups, as described herein, are performed once for each of the larger single UDP packets 224 and 226 by the network stack 228, which then makes an up call to the application 208 for each of the larger single UDP packets 224 and 226.

The application 208 then receives the larger single UDP packets 224 and 226, that is the large coalesced packets, from the network stack 228. For example, the network stack 228 sends each of the larger single UDP packets 224 and 226 once to the network adapter 202. Specifically, all of the data packets in each larger single UDP packet 224 and 226 is sent to the application 208 at the same time. Thus, a single large buffer or multiple buffers are posted and completed at the same time. It should be noted that the coalesce batching can be used so that the UDP knows the limits of the packets.

In some examples, at the UDP layer, with the present disclosure, when a down call is made, the batch size is identified, wherein certain values of batch size are better for system performance. The sizes of the batches can be determined empirically or tuned automatically. Thus, the batch sizes can be predefined or dynamically determined. In one example, there can be ten data flows. In some examples, six sockets 210 are provided on the send side and eight sockets 210 are provided on the receive side (e.g., ten flows having a total of 200 packets). In some examples, buffers are pre-allocated. It should be understood that the number of data flows, sockets, and/or buffers can be changed as desired or needed.

It should be noted that at the UDP layer, the down call needs to know the batch size, and certain values of batch size provide improved performance, such as determined by experimentation (e.g. measure system usage in wired and wireless systems). In some examples, the system is tuned automatically to determine the number of sockets on each of the send and receive sides that is optimized to determine a maximum gain point. That is, an automated determination of optimal send and receive packets is performed as a determination of the point wherein if additional sockets are added, there is no efficiency gain, but there is a cost of data size (memory overhead of keeping track of all flows). Thus, there is a tradeoff between memory usage and performance that is considered when setting the packet size. Thus, in some examples, system usage can be measured to determine batch sizes. It should be noted that the various examples apply to wired and wireless systems and the batch sizes can be different for each.

In some examples, the present disclosure is implemented in connection with UDP/IP only, and having IP connectivity and not layer 2 connectivity. It should also be appreciated that various examples can be implemented with any protocol on top of UDP. Thus, various examples include batching APIs for QUIC and fast lookups (e.g., per processor hash tables).

Additionally, as described herein, one or more APIs, such as send and receive APIs are used that allow for a determination of the batched packet size. For example, on the send side, the API indicates the packet size (e.g., 1200 bytes), such as a send (batch 64k). It should be noted that IP fragmentation is avoided as the application posts packet sizes that are smaller than the MTU size. With this configuration, one call is made to UDP, which generates the packets, the packets are sent into the hardware. Accordingly, one API call is made instead of many. Using individual UDP packets, send and receive operations support packet fragmentation without using IP fragmentation. Similarly, on the receive side, by marking the socket as batched, the message side is preserved with the API, such as a receive (batch packet). Thus, when packets that are received on the receive side on a socket that is marked 'batched', the individual packets are combined to create a single larger packet (e.g., with a 3600 byte payload). It should be noted that the message size of each packet is preserved upon receipt, as an out-of-band message.

Scalable Sockets

Figure 5:
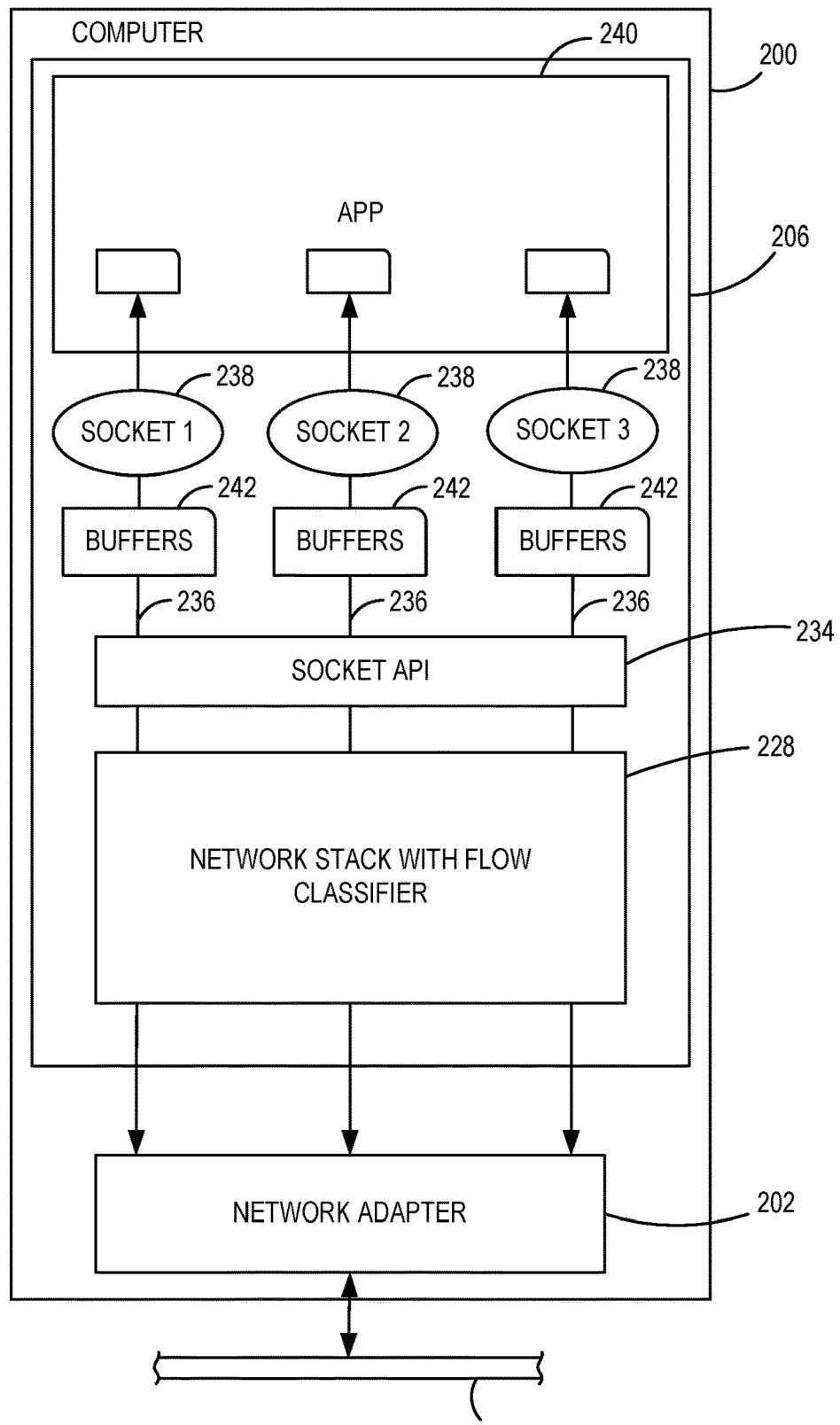
FIG. 5 illustrates server behavior with scalable sockets according an embodiment.

The computer 200, particularly as illustrated in FIG. 5, is configured to have scalable UDP sockets. UDP is a connectionless protocol. Various examples mimic the concept of TCP socket connections, but over UDP. This is performed via a UDP datagram socket API 234 that creates an 'object' for each remote client requesting a connection. Additionally, a fast lookup (based in part on a connection ID from QUIC) for received packets is provided using per processor (CPU) hash tables in some examples. One or more examples also parse and identify each packet, low in the stack, to perform flow classification.

In various examples, the UDP datagram socket API 234 is made more TCP stream socket like and the UDP connections are introduced as an API entity. In an environment where QUIC replaces TCP as a transport, the UDP datagram socket API 234 allows a QUIC server implementing the present disclosure and the computer 200 to scale as well as TCP and with improved performance in various examples. Thus, in some examples, a QUIC scalable server allows for the scalable sockets.

More particularly, various examples, such as illustrated in FIG. 5, include the following:
1. An API for UDP sockets, namely the UDP datagram socket API 234, that allows a listening socket to spawn child UDP connections 236. Each connection 236 is a separate socket 238 and there is no fate sharing or shared socket buffers.
2. Lookup logic on the receive data path identifies the socket object on which to deliver the data. This lookup logic keeps backward compatibility with current UDP sockets. In some examples, the lookup logic uses a QUIC connection identification (CID) and the hash table to parse and identify received UDP packets. It should be noted that the CID can be hashed from the packets to facilitate performing different processes, including routing the data traffic as described herein.

In conventional arrangements, to build a server application on top of UDP sockets, the API only allows the creation of a single socket bound to a well-known UDP port and IP address. All incoming connections from different clients (even though the connection are all on different 4-tuples) all share the same socket for receive processing.

Various examples add a listen and accept API for UDP sockets, namely the UDP datagram socket API 234. A server application 240 listens on a well-known UDP port and IP address, and then upon receiving a first packet, calls an accept API or a connect API, which can be configured as or forms part of the UDP datagram socket API 234, to create a child socket object that tracks the new connection (e.g., 4-tuple). All subsequent packets for this UDP connection are delivered on the new child socket object.

On the receive data path, when an incoming UDP packet is processed, the lookup logic first attempts to find a connection object corresponding to the 4-tuple. This is implemented in one example as a hash table lookup. If no such object is found, then a traditional lookup is performed to find the matching 2-tuple (listener).

RSS also allows the processing of different UDP connections on different processors, allowing scale out, and there is no lock contention. Also each UDP connection object has corresponding resources including the buffers 242, which in some embodiments are both send and receive buffers for each socket 238, so for example, there is no fate sharing on the receive side. In various examples, the QUIC transport protocol server uses the UDP datagram socket API 234 for high performance scale out.

As such, in operation, the computer 200 includes scalable sockets 238 for transmitting and receiving UDP data packets over the physical network link 204. For example, the server application 240 has multiple UDP connections 236 to which remote client applications have connected. In this example, the server application 240 has multiple UDP sockets 238, which include one for each remote client connection. Each socket 238 has a send buffer and a receive buffer, illustrated as the buffers 242. The buffers 242 are configured to allow for performing synchronization operations on network traffic. For example, the UDP packets for each of the UDP sockets 238 can be separately time synchronized. In some examples, each socket for each client has separate data queues. As described herein, in some examples, separate objects are generated for each socket, thereby allowing for scaling.

In the illustrated example, the network stack 228 has a lookup, such as a hash table lookup for the UDP flows. For example, the network stack 228 in one example has a lookup on the receive paths that results in the different sockets 238 for the different UDP connections 236. As a result, bottlenecking from scaling and fate sharing are eliminated in various examples.

Thus, various examples include a scalable UDP server having a UDP API that is configured to perform listen and accept on the UDP side. In some examples, the operations mimic TCP, wherein one object is created for each remote client. That is, each client has a corresponding resource on the server side. For example, a listen socket API: listen (443), is added, and then a fork off is performed to a UDPConnectedSocket( ) to mimic TCP, which creates one object for each remote client. In one example, a QUIC server (at the receive side) has access to this function in some examples. The sever also has a close( ) function to end the listen socket. It should be noted that the same API can be used for non-QUIC servers. That is, the herein described examples include APIs that work with any "scalable UDP server", such as with all UDP applications.

It should be appreciated that QUIC also supports failover. For example, if WiFi fails, then long-term evolution (LTE) can be used. While the IP address changes, when switching networks due to failover, the connection ID remains the same. The receive side can then use the connection ID to find the connection.

Exemplary Operations

Figure 6:
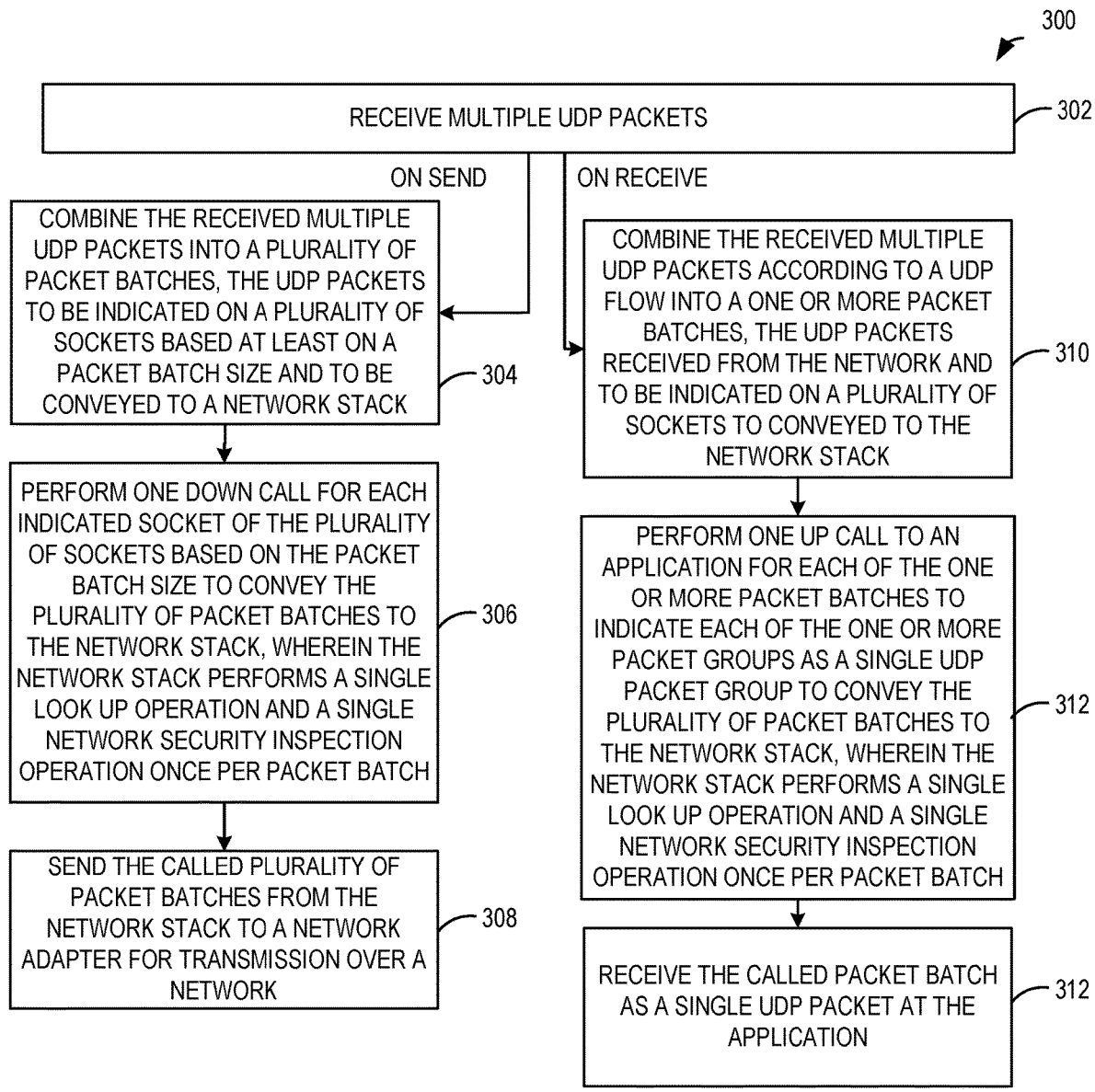
FIG. 6 is an exemplary flow chart illustrating operations of a computing device for performing batched UDP processing according to an embodiment.
Figure 7:
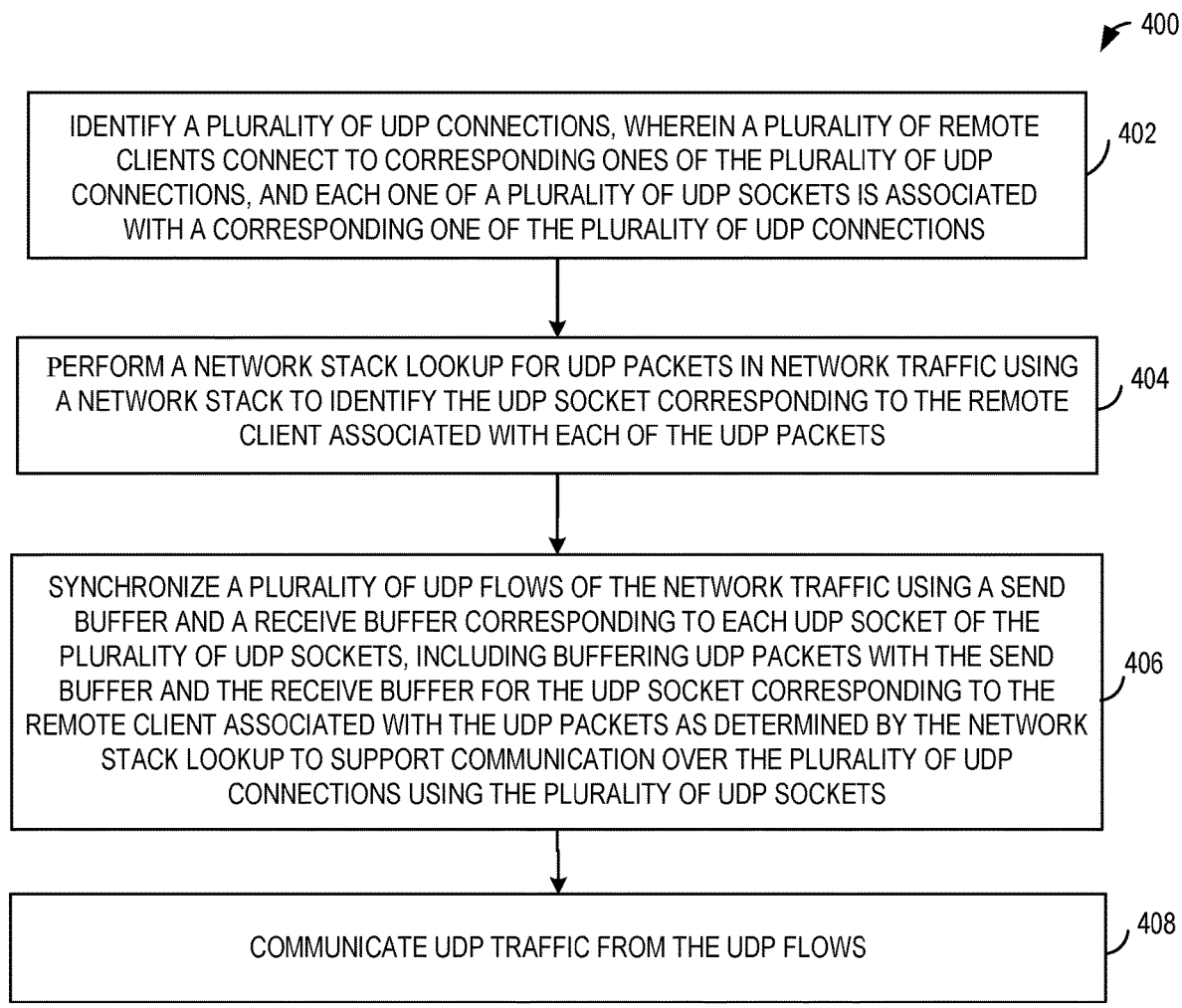
FIG. 7 is an exemplary flow chart illustrating operations of a computing device for supporting UDP connections with scalable sockets according to an embodiment.

Various examples include methods for batched UDP processing and scalable sockets to support UDP connections. The methods can be performed, for example, by the computer system 200. FIGS. 6 and 7 illustrate exemplary flow charts of methods 300 and 400 for performing batched UDP processing and scalable sockets to support UDP connections. The operations illustrated in the flow charts described herein can be performed in a different order than is shown, can include additional or fewer steps and can be modified as desired or needed. Additionally, one or more operations can be performed simultaneously, concurrently or sequentially. It should be noted that in some examples, the method 300 and/or the method 400 is offloaded to hardware (e.g., a network card) as needed or desired.

With reference to the method 300 illustrated in FIG. 6, the computing device receives multiple UDP packets at 302. For example, the computing device receives UDP packets that can be UDP packets that are to be sent as part of a send operation or processed as part of a receive operation. Both operations can include batched UDP processing as described herein.

On a send operation, multiple UDP packets to indicate on a plurality of sockets are received at 304 for batched UDP processing. For example, an application has multiple UDP packets to indicate on the sockets and that are to be transmitted. The received multiple UDP packets are combined into a plurality of packet batches at 304. That is, a plurality of UDP packets are combined into one or more packet batches to be sent a larger data packets based at least on a packet batch size. Any packet combining technique can be used.

The application then performs one down call for each indicated socket of the plurality of sockets based on a packet batch size at 306 to convey the plurality of packet batches to a network stack. As such, a call is made to a corresponding socket with respect to a single larger batch of packets at the same time, instead of making separate calls for each of the individual UDP packets. With this single down call per packet batch, the network stack is able to perform a single look up operation and a single network security inspection operation once per packet batch as described herein. For example, with the characteristics being the same for every UDP packet in the packet batch, the network stack is able to perform a reduced number of look up operations and inspect operations on network traffic.

The called plurality of packet batches are then sent from the network stack to a network adapter at 308 for transmission over a network. For example, a network adapter then transmits the packet batches to a physical network link.

On a receive operation, a plurality of UDP packets are received from the network at 310. The UDP packets are to be batch processed according to the examples described herein. More particularly, the received plurality of UDP packets are combined at 310 according to a UDP flow into a one or more packet groups. That is, the network adapter indicates a packet batch to the network stack. With the UDP packets combined or grouped, and similar to the send operation, a single up call to the application is performed for each of the one or more packet batches at 312 to indicate each of the one or more packet groups as a single UDP packet group (or as a single receive indication) to the application.

With the batched packets of the present disclosure having a corresponding single up call for each of the packet batches, the network stack is also able to perform a single look up operation and a single network security inspection operation once per packet group. For example, with the characteristics being the same for every UDP packet in the packet group, the network stack is able to perform a reduced number of look up operations and inspect operations on network traffic also on the receive side. It should be noted that in one or more examples, some of the look up operations or inspection operations can occur per UDP packet.

In some examples, the network stack indicates an offset for each of the UDP packets, and during the receive operation, the payload of the single UDP packet is split into a plurality of individual messages as sent by a sending application. That is, the offset is a value or other indicator of how to split the payload based on how the packets were grouped.

In some examples, the network stack performs flow classification to group the UDP packets into a chain of packets belonging to the same UDP flow. For example, the flow classification is performed using one of an RSS hash table or a lookup of a 4-tuple, wherein the 4-tuple includes a source IP address, a source port, a destination IP address, and a destination port, as described herein. In this way, packets are grouped per UDP flow.

The application receives each respective packet group at the same time at 312 instead of multiple packets at different times. That is, a single packet group is received through a corresponding socket instead of multiple packets. As such, instead of having posted buffers with individual packets being received individually through the socket, a plurality of packets in the packet group are received through the socket at the same time.

It should be appreciated that variations and modifications are contemplated. For example, the plurality of UDP packets for the same UDP flow can be coalesced into the single UDP packet to be indicated to the application with message boundary information. In this example, the message boundary information indicates portions of the payload of the single UDP packet that correspond to a plurality of individual messages. Coalesce batching is performed in some examples to identify the limits of the packets (size limits) for UDP communications.

With the batch processing of UDP packets in various examples, the batch size can be changed. For example, the packet batch size can be automatically tuned for both send and/or receive operations using one of an online learning process or an offline learning process. It should be noted that in order to maintain a message size of each of the received single UDP packets upon receipt, the plurality of sockets can be marked as batched sockets. For example, an indicator (e.g., batch value number) can be used.

Thus, in some examples, the send and receive operations are performed according to configured APIs. For example, a send batch API for UDP sockets is configured to allow an application to post multiple messages as a batch in the one down call to a network interface comprising a NIC, without incurring any IP fragmentation. As another example, a receive batch API for UDP sockets is configured to allow chaining of multiple received UDP packets from the NIC to construct a batch to be indicated to the application. As another example, a receive batch API for UDP sockets is configured to allow coalescing of multiple received UDP packets from the NIC to construct the single UDP packet to be indicated to the application with message boundary information. It should be appreciated that different APIs can be configured to accomplish the examples of the present disclosure.

With reference to the method 400 illustrated in FIG. 7, a system having scalable sockets to support UDP connection is provided in some examples. In one example, the server application has a plurality of UDP connections, wherein one or more remote clients connect to one or more of the plurality of UDP connections. In this example, the plurality of UDP connections are identified at 402, such as identifying the UDP connections and the remote clients currently connecting to any of the UDP connections. This process includes, in some examples, identifying remote client applications that have connection to one or more of the plurality of UDP connections. In some examples, the system includes a plurality of UDP sockets. Each one of the plurality of UDP sockets is associated with a corresponding one of the plurality of UDP connections in some examples. Thus, a plurality of UDP connections are identified, wherein a plurality of remote clients connect to corresponding ones of the plurality of UDP connections, and each of the plurality of UDP sockets are associated with a corresponding one of the plurality of UDP connections.

A network stack lookup for UDP packets in network traffic is performed at 404 using a network stack to identify the UDP socket corresponding to the remote client associated with each of the UDP packets. For example, the lookup is performed for each of the UDP connections having corresponding UDP flows as described herein (e.g., to identify a socket object on which to deliver the data). The lookup supports communication over the plurality of UDP connections using the plurality of UDP sockets. For example, during receive operation, the lookup is performed on receive paths that results in different sockets for the different connections.

In some examples, an API for the plurality of UDP sockets allows a listening socket to create child UDP connections. Each child UDP connection has a corresponding individual socket without fate sharing (e.g., interconnected components do not fail together) and/or shared buffers or locks, in some examples, and a child socket object is associated with each of the one or more clients. The method then uses lookup logic on a receive data path to identify the child socket object for each of the child connections on which to deliver data. The lookup logic in some examples maintains backward compatibility between the child UDP connections and current UDP sockets. In one example, the lookup logic uses the child socket objects to track the child UDP connections by finding a connection object corresponding to a 4-tuple using a hash table. The 4-tuple includes a source IP address, a source port, a destination IP address, and a destination port in one example and as described herein.

In one example, a plurality of hash tables are provided and configured as per processor (CPU) hash tables corresponding to different processors of the lookup logic. In various examples, the one or hash tables are positioned in a lower portion of the network stack (e.g., at a bottom of the network stack) to parse and identify received UDP packets. In some examples, different processors corresponding to the per processor hash tables perform the RSS of different child UDP connections, wherein each UDP connection object has a corresponding receive buffer. The lookup logic uses the CID and the hash table to parse and identify received UDP packets in some examples as described herein. That is, with a unique CID for the UDP packets, the lookup logic identifies the UDP packets by performing a lookup operation in the hash table. In some examples, the CID and 4-tuple are used to perform a hash table lookup.

It should be appreciated that a hash table is one example of a data structure used to implement an associative array and other methods to track the child UDP connections, such as tracking methods in the data flow tracking technology, can be used.

Synchronization operations are performed on network traffic by a send buffer and a receive buffer for each UDP socket of the plurality of UDP sockets at 406. In some examples, a plurality of UDP flows of the network traffic are synchronized or controlled using a send buffer and a receive buffer corresponding to each UDP socket of the plurality of UDP sockets. The operation includes, in various examples, buffering UDP packets with the send buffer and the receive buffer for the UDP socket corresponding to the remote client associated with the UDP packets as determined by the network stack lookup to support communication over the plurality of UDP connections using the plurality of UDP sockets.

For example, with the server application having multiple sockets (one socket per client), the send and receive buffers are configured to perform synchronization operations of network traffic through the plurality of UDP sockets. In some examples, synchronous client socket operations are performed by the send and receive buffers. For example, synchronization can include queuing the UDP packets in the send buffer and/or receive buffer to ensure synchronous operation such that UDP flows are communicated through corresponding buffers associated with a particular UDP socket.

The UDP traffic for each of the UDP flows are then communicated at 408, such as transmitted over the network (for send operation) or received by the application (for receive operation). For example, UDP traffic corresponding to each of the UDP sockets is transmitted over the network or received by the application.

It should be noted that the examples described herein can be employed in different applications and systems. For example, the batching described herein can be performed for any datagram on top of IP.

Thus, various examples provide faster UDP processing using batching (e.g., batch APIs) and/or scalable UDP connected sockets.

Exemplary Operating Environment

Figure 8:
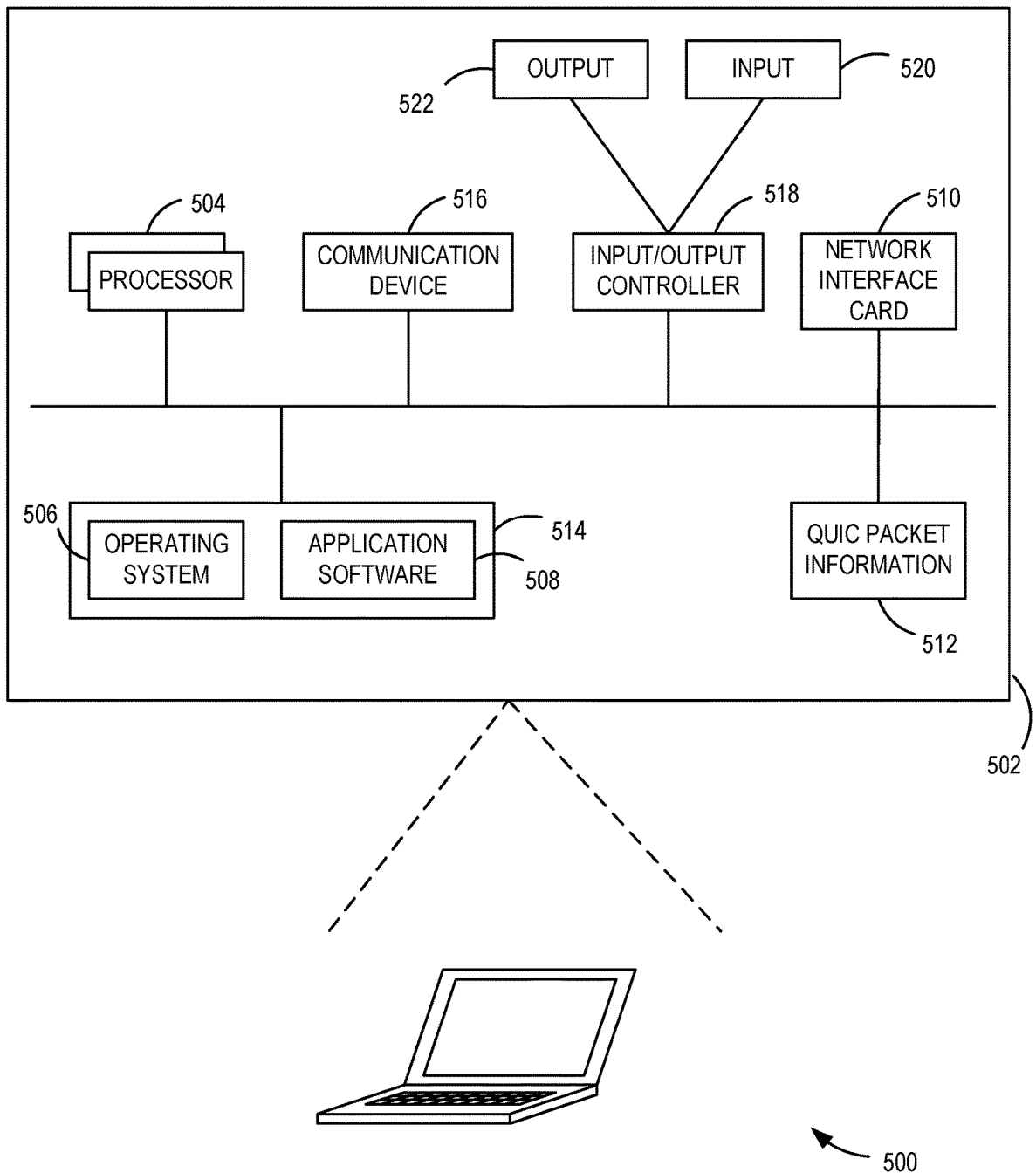
FIG. 8 illustrates a computing apparatus according to an embodiment as a functional block diagram.

The present disclosure is operable with a computing apparatus 502 according to an embodiment as a functional block diagram 500 in FIG. 8. In one example, components of the computing apparatus 502 may be implemented as a part of an electronic device according to one or more embodiments described in this specification. The computing apparatus 502 comprises one or more processors 504 which may be microprocessors, controllers or any other suitable type of processors for processing computer executable instructions to control the operation of the electronic device. Platform software comprising an operating system 506 or any other suitable platform software may be provided on the apparatus 502 to enable application software 508 to be executed on the device. According to an embodiment, batch APIs and scalable UDP connected sockets are provided in connection with a network interface card 510 using QUIC packet information 512.

Computer executable instructions may be provided using any computer-readable media that are accessible by the computing apparatus 502. Computer-readable media may include, for example, computer storage media such as a memory 514 and communications media. Computer storage media, such as the memory 514, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 514) is shown within the computing apparatus 502, it will be appreciated by a person skilled in the art, that the storage may be distributed or located remotely and accessed via a network or other communication link (e.g. using a communication device 516).

The computing apparatus 502 may comprise an input/output controller 518 configured to output information to one or more input devices 520 and output devices 522, for example a display or a speaker, which may be separate from or integral to the electronic device. The input/output controller 518 may also be configured to receive and process an input from the one or more input devices 520, for example, a keyboard, a microphone or a touchpad. In one embodiment, the output device 522 may also act as the input device 520. An example of such a device may be a touch sensitive display. The input/output controller 518 may also output data to devices other than the output device 522, e.g. a locally connected printing device. In some embodiments, a user may provide input to the input device(s) 520 and/or receive output from the output device(s) 522.

In some examples, the computing apparatus 502 detects voice input, user gestures or other user actions and provides a natural user interface (NUI). This user input may be used to author electronic ink, view content, select ink controls, play videos with electronic ink overlays and for other purposes. The input/output controller 918 outputs data to devices other than a display device in some examples, e.g. a locally connected printing device.

The functionality described herein can be performed, at least in part, by one or more hardware logic components. According to an embodiment, the computing apparatus 502 is configured by the program code when executed by the processor(s) 504 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Other examples include:
A system having scalable sockets to support User Datagram Protocol (UDP) connections, the system comprising:
a plurality of UDP sockets, each of the plurality of UDP sockets associated with a corresponding one of a plurality of UDP connections, one or more remote clients connecting to one or more of the plurality of UDP connections;
a send buffer and a receive buffer for each UDP socket of the plurality of UDP sockets, the send buffer and the receive buffer performing one or more synchronization operations on network traffic to be communicated via a network stack; and
a processor performing a network stack lookup for a plurality of UDP flows corresponding to the network traffic using the network stack, each of the plurality of UDP flows corresponding to one of the plurality of UDP connections to support communication of the network traffic over the plurality of UDP connections using the plurality of UDP sockets.

Other examples include:
A computerized method to support User Datagram Protocol (UDP) connections with scalable sockets, the method comprising:
identifying a plurality of UDP connections, wherein a plurality of remote clients connect to corresponding ones of the plurality of UDP connections, and each one of a plurality of UDP sockets is associated with a corresponding one of the plurality of UDP connections;
performing a network stack lookup for UDP packets in network traffic using a network stack to identify the UDP socket corresponding to the remote client associated with each of the UDP packets; and
synchronizing a plurality of UDP flows of the network traffic using a send buffer and a receive buffer corresponding to each UDP socket of the plurality of UDP sockets, including buffering UDP packets with the send buffer and the receive buffer for the UDP socket corresponding to the remote client associated with the UDP packets as determined by the network stack lookup to support communication over the plurality of UDP connections using the plurality of UDP sockets.

Other examples include:
One or more computer storage media having computer-executable instructions for supporting User Datagram Protocol (UDP) connections with scalable sockets that, upon execution by a processor, cause the processor to at least:
identify a plurality of UDP connections, wherein a plurality of remote clients connect to corresponding ones of the plurality of UDP connections, and each one of a plurality of UDP sockets is associated with a corresponding one of the plurality of UDP connections;
perform a network stack lookup for UDP packets in network traffic using a network stack to identify the UDP socket corresponding to the remote client associated with each of the UDP packets; and
synchronize a plurality of UDP flows of the network traffic using a send buffer and a receive buffer corresponding to each UDP socket of the plurality of UDP sockets, including buffering UDP packets with the send buffer and the receive buffer for the UDP socket corresponding to the remote client associated with the UDP packets as determined by the network stack lookup to support communication over the plurality of UDP connections using the plurality of UDP sockets.

Alternatively, or in addition to the examples described above, examples include any combination of the following:
wherein an Application Programming Interface (API) for the plurality of UDP sockets allows a listening socket to create child UDP connections as the plurality of UDP connections, each child UDP connection having a corresponding individual socket, and a child socket object is associated with a corresponding one of each of the plurality of remote clients, and further comprising using lookup logic on a receive data path, including the network stack, to identify the child socket object for each of the child connections on which to deliver data, the lookup logic maintaining backward compatibility between the child UDP connections and current UDP sockets.

wherein the lookup logic uses the child socket objects to track the child UDP connections by finding a connection object corresponding to a 4-tuple using the hash table, the 4-tuple including a source Internet Protocol (IP) address, a source port, a destination IP address, and a destination port.

a plurality of hash tables that are configured as per processor hash tables corresponding to different processors of the lookup logic, the hash tables positioned in a lower portion of the network stack to parse and identify received UDP packets.

performing, with different processors corresponding to the per processor hash tables, receive side scaling (RSS) of different child UDP connections, wherein each UDP connection object has a corresponding receive buffer.

wherein the lookup logic uses a QUIC connection identification (CID) and the hash table to parse and identify received UDP packets.

wherein the send and receive buffers control overall synchronization operation based at least on the data at each of the send and receive buffers.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for training a neural network. The illustrated one or more processors 1104 together with the computer program code stored in memory 1114 constitute exemplary processing means for using and/or training neural networks.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A device comprising:
   a processor; and
   memory coupled to the processor, the memory comprising computer executable instructions that, when executed, perform operations comprising:
      receiving, from an application implemented by the device, a plurality of UDP packets to be sent to a remote client;
      combining the plurality of UDP packets into a packet batch, wherein the combining comprises:
         determining a size of the packet batch, and
         attaching a UDP header to the packet batch;
      conveying the packet batch to a network stack by performing a down call for an indicated socket of a plurality of UDP sockets based on the size of the packet batch, the plurality of UDP sockets being implemented by the device, the indicated socket providing a UDP connection to the remote client; and
      sending the packet batch from the network stack to a network adapter for transmission over a network.

2. The device of claim 1, wherein the down call is a single down call performed for the packet batch.

3. The device of claim 1, the operations further comprising determining the size of the packet batch based at least on system usage.

4. The device of claim 1, the operations further comprising executing each lookup operation in a data path once for the packet batch.

5. The device of claim 4, wherein each lookup operation comprises: network security inspection, address resolution, or finding a data route.

6. The device of claim 1, wherein determining the size of the packet batch comprises:
   determining a maximum transmission unit (MTU); and
   based at least on the MTU, setting the size of the packet batch below the MTU.

7. The device of claim 1, the operations further comprising attaching an Internet Protocol header to the packet batch.

8. A system comprising:
   a processor; and
   memory coupled to the processor, the memory comprising computer executable instructions that, when executed, perform operations comprising:
      receiving, from an application implemented by a device, a plurality of UDP packets to be sent to a remote client;
      combining the plurality of UDP packets into a packet batch, wherein the combining comprises:
         determining a size of the packet batch; and
         attaching a UDP header to the packet batch;
      conveying the packet batch to a network stack by performing a down call for an indicated socket of a plurality of UDP sockets based on the size of the packet batch, the plurality of UDP sockets being implemented by the device, the indicated socket providing a UDP connection to the remote client; and
      sending the packet batch from the network stack to a network adapter for transmission over a network.

9. The system of claim 8, wherein the down call is a single down call performed for the packet batch.

10. The system of claim 8, the operations further comprising determining the size of the packet batch based at least on system usage.

11. The system of claim 8, the operations further comprising executing each lookup operation in a data path once for the packet batch.

12. The system of claim 11, wherein each lookup operation comprises: network security inspection, address resolution, or finding a data route.

13. The system of claim 8, wherein determining the size of the packet batch comprises:
   determining a maximum transmission unit (MTU); and
   based at least on the MTU, setting the size of the packet batch below the MTU.

14. The system of claim 8, the operations further comprising attaching an Internet Protocol header to the packet batch.

15. A non-transitory computer-readable storage media comprising computer-executable instructions that, when executed by a processor, cause the processor to:
   receive a plurality of UDP packets;
   combine the plurality of UDP packets into a packet batch, wherein combining the plurality of UDP packets comprises:
      determine a size of the packet batch; and
      attach a UDP header to the packet batch;
   convey the packet batch to a network stack at least by performing a down call for an indicated socket of a plurality of UDP sockets based on the size of the packet batch, the plurality of UDP sockets being implemented by a device, the indicated socket providing a UDP connection to a remote client; and
   send the packet batch from the network stack to a network adapter for transmission over a network.

16. The computer-readable storage media of claim 15, wherein the down call is a single down call, and wherein the computer-executable instructions further cause the processor to perform the single down call for the packet batch.

17. The computer-readable storage media of claim 15, wherein the computer-executable instructions further cause the processor to determine the size of the packet batch based at least on system usage.

18. The computer-readable storage media of claim 15, wherein the computer-executable instructions further cause the processor to execute each lookup operation in a data path once for the packet batch.

19. The computer-readable storage media of claim 18, wherein each lookup operation comprises: network security inspection, address resolution, or finding a data route.

20. The computer-readable storage media of claim 15, wherein determining the size of the packet batch comprises:
   determining a maximum transmission unit (MTU); and
   based at least on the MTU, setting the size of the packet batch below the MTU.

\* \* \* \* \*